US012266296B2

(12) United States Patent
Hwang et al.

(10) Patent No.: US 12,266,296 B2
(45) **Date of Patent: *Apr. 1, 2025**

(54) DISPLAY DEVICE AND DRIVING METHOD THEREFOR

(71) Applicant: SAMSUNG DISPLAY CO., LTD., Yongin-si (KR)

(72) Inventors: Young Soo Hwang, Yongin-si (KR); Hideo Yoshimura, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,496

(22) Filed: Nov. 9, 2023

(65) Prior Publication Data

US 2024/0071297 A1 Feb. 29, 2024

Related U.S. Application Data

(63) Continuation of application No. 17/602,525, filed as application No. PCT/KR2020/007673 on Jun. 12, 2020, now Pat. No. 11,875,733.

(30) Foreign Application Priority Data

Dec. 13, 2019 (KR) ........................ 10-2019-0167039

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2300/0842* (2013.01);
(Continued)

(58) Field of Classification Search
CPC .................. G09G 3/32; G09G 3/2007; G09G 2300/0842; G09G 2310/08; G09G 2320/0233; G09G 2330/021
See application file for complete search history.

(56) References Cited

U.S. PATENT DOCUMENTS 8,988,329 B2 3/2015 Yoon et al.
9,875,693 B2 1/2018 Kwon et al.
(Continued)

FOREIGN PATENT DOCUMENTS

CN 104732920 A 6/2015
KR 20140080728 A 7/2014
(Continued)

OTHER PUBLICATIONS

International Search Report mailed Sep. 4, 2020 for PCT/KR2020/007673.

(Continued)

*Primary Examiner* — Kenneth B Lee, Jr.
(74) *Attorney, Agent, or Firm* — CANTOR COLBURN LLP

(57) ABSTRACT

A display device includes pixels connected to scan lines, control lines, data lines, and sensing lines; a scan driver configured to supply a scan signal to the scan lines and supply a control signal to the control lines; a data driver configured to supply one of an image data signal and a sensing data signal to the data lines; a sensing circuit configured to sense the characteristics based on a sensing current supplied through the sensing lines during the sensing period; and a power supply configured to supply a voltage of first power to the pixels. The sensing period includes a first sensing period during which a first sensing current is extracted based on a first sensing data signal corresponding to a first grayscale, and a second sensing period during which a second sensing current is extracted based on a
(Continued)

second sensing data signal corresponding to a second grayscale, and the voltage of the first power supplied during the first sensing period is different from the voltage of the first power supplied during the second sensing period.

13 Claims, 10 Drawing Sheets

(52) U.S. Cl.
CPC . *G09G 2310/08* (2013.01); *G09G 2320/0233* (2013.01); *G09G 2330/021* (2013.01)

(56) References Cited

U.S. PATENT DOCUMENTS

| | | | |
|---|---|---|---|
| 10,157,569 B2 | 12/2018 | Kim et al. | |
| 10,580,337 B2 | 3/2020 | Chaji et al. | |
| 10,783,814 B2 | 9/2020 | Chaji | |
| 11,875,733 B2 * | 1/2024 | Hwang | G09G 3/3233 |
| 2011/0109660 A1 | 5/2011 | Kim | |
| 2015/0179105 A1 | 6/2015 | Mizukoshi | |
| 2015/0187271 A1 | 7/2015 | Bae et al. | |
| 2017/0032738 A1 | 2/2017 | Lee | |
| 2017/0032743 A1 | 2/2017 | Lee et al. | |
| 2019/0035331 A1 | 1/2019 | Do et al. | |

FOREIGN PATENT DOCUMENTS

| | | | |
|---|---|---|---|
| KR | 20150057587 | A | 5/2015 |
| KR | 20150071546 | A | 6/2015 |
| KR | 1020160050831 | A | 5/2016 |
| KR | 1020160061569 | A | 6/2016 |
| KR | 1020160148732 | A | 12/2016 |
| KR | 1020170051785 | A | 5/2017 |
| KR | 1020170118286 | A | 10/2017 |
| KR | 20190074814 | A | 6/2019 |

OTHER PUBLICATIONS

Written Opinion of the International Searching Authority for PCT/KR2020/007673 issued on Sep. 4, 2020.

Chinese Office Action Issued In CN Patent Application No. 202080033324.9, Issue Date Sep. 6, 2024, 10 Pages.

* cited by examiner

Vs = constant

DISPLAY DEVICE AND DRIVING METHOD THEREFOR

This application is a continuation of U.S. patent application Ser. No. 17/602,525, filed on Oct. 8, 2021, which claims priority to International Patent Application No. PCT/KR2020/007673, filed on Jun. 12, 2020, which claims priority to Korean Patent Application No. 10-2019-0167039, filed on Dec. 13, 2019, and all the benefits accruing therefrom under 35 U.S.C. § 119, the content of which in its entirety is herein incorporated by reference.

TECHNICAL FIELD

Various embodiments of the present disclosure generally relate to a display device and a method of driving the display device, and more particularly to a display device to which an external compensation scheme is applied and a method of driving the display device.

BACKGROUND ART

A self-emissive display device displays an image using pixels connected to a plurality of scan lines and data lines. For this operation, each of the pixels has a light-emitting element and a driving transistor.

The driving transistor controls the amount of current that is supplied to the light-emitting element in response to a data signal supplied from a corresponding data line. The light-emitting element generates light with a predetermined luminance in accordance with the amount of current supplied from the driving transistor.

In order for the display device to display images having uniform image quality, driving transistors included in respective pixels should supply substantially the same current to light-emitting elements in accordance with a data signal. However, the driving transistors included in respective pixels have their inherent characteristic values in which deviations may be present.

In an example, threshold voltages and mobility of driving transistors may be set differently in respective pixels, or may change due to degradation caused by the use of the driving transistors, and thus luminance differences between images may occur.

Disclosure

Technical Problem

An aspect of the present disclosure is to provide a display device which changes the voltage of first power to be supplied to pixels depending on the grayscale of a data signal during a sensing period.

Another aspect of the present disclosure is to provide a method of driving the display device.

However, the aspects of the present disclosure are not limited to the foregoing aspects, and may be expanded in various forms without departing from the spirit and scope of the present disclosure.

Technical Solution

In order to accomplish an aspect of the present disclosure, a display device according to embodiments of the present disclosure is driven such that a period thereof is divided into a display period during which an image is displayed and a sensing period during which characteristics of a driving transistor included in each of pixels are sensed. The display device includes the pixels connected to scan lines, control lines, data lines, and sensing lines; a scan driver which supplies a scan signal to the scan lines and supplies a control signal to the control lines; a data driver which supplies one of an image data signal and a sensing data signal to the data lines; a sensing circuit which senses the characteristics based on a sensing current supplied through the sensing lines during the sensing period; and a power supply which supplies a voltage of first power to the pixels. The sensing period includes a first sensing period during which a first sensing current is extracted based on a first sensing data signal corresponding to a first grayscale, and a second sensing period during which a second sensing current is extracted based on a second sensing data signal corresponding to a second grayscale, and the voltage of the first power supplied during the first sensing period is different from the voltage of the first power supplied during the second sensing period.

According to an embodiment, the first sensing period and the second sensing period may successively progress.

According to an embodiment, the power supply may be configured to output the first power having a first sensing voltage in accordance with the first grayscale during the first sensing period.

According to an embodiment, the power supply may be configured to output the first power having a second sensing voltage different from the first sensing voltage in accordance with the second grayscale during the second sensing period.

According to an embodiment, the power supply may be configured to output the first power having a display voltage for image display during the display period.

According to an embodiment, the display voltage may be equal to one of the first sensing voltage and the second sensing voltage.

According to an embodiment, a difference between the first sensing voltage and the second sensing voltage may be a result obtained by reflecting a difference between channel length modulation effects of the driving transistor depending on a difference between the first grayscale and the second grayscale.

According to an embodiment, the difference between the first sensing voltage and the second sensing voltage may be proportional to a difference between a gate-source voltage of the driving transistor corresponding to the first sensing data signal and a gate-source voltage of the driving transistor corresponding to the second sensing data signal.

According to an embodiment, the data driver may be configured to supply the first sensing data signal to the pixels during the first sensing period, and supply the second sensing data signal to the pixels during the second sensing period.

According to an embodiment, the sensing circuit may be configured to calculate mobility characteristics and threshold voltage characteristics of the characteristics of the driving transistor based on the first sensing current and the second sensing current.

According to an embodiment, the sensing circuit may include an analog-to-digital converter which converts the first sensing current and the second sensing current into first sensing data and second sensing data, each having a digital format; and a compensator which calculates the mobility characteristics and threshold voltage characteristics of the driving transistor by performing an operation on the first sensing data and the second sensing data and [[to]] determines a compensation value for the image data based on the mobility characteristics and the threshold voltage characteristics.

According to an embodiment, the sensing circuit may further include a memory which stores at least one of the first sensing data and the second sensing data.

According to an embodiment, among the pixels, a pixel located in an i-th horizontal line (where i is a natural number) may include a light-emitting element; a first transistor which controls a current which flows from the power supply into a second node in accordance with a voltage of a first node, the first transistor corresponding to the driving transistor; a second transistor connected between the first node and one of the data lines, the second transistor including a gate electrode connected to an i-th scan line of the scan lines; a third transistor connected between the second node and a j-th sensing line of the sensing lines, the third transistor including a gate electrode connected to an i-th control line of the control lines; and a storage capacitor connected between the first node and the second node.

According to an embodiment, the control signal that is supplied during each of the first sensing period and the second sensing period may have a time duration longer than a time duration of the control signal that is supplied during the display period.

According to an embodiment, part of a time duration of the control signal supplied to the i-th control line may overlap a time duration of the scan signal supplied to the i-th scan line during each of the first sensing period and the second sensing period, and the control signal may be supplied for the time duration longer than the time duration of the scan signal.

According to an embodiment, when the second transistor and the third transistor are turned on, a reference voltage may be supplied to the second node through the j-th sensing line, and when the second transistor is turned off in a turned-on state of the third transistor, one of the first sensing current and the second sensing current may be supplied to the sensing circuit through the j-th sensing line.

In order to accomplish an aspect of the present disclosure, a method of driving a display device according to embodiments of the present disclosure includes supplying a first sensing data signal corresponding to a first grayscale, first power having a first sensing voltage, and a reference voltage to a pixel during a first sensing period; sensing a first sensing current, generated based on the first sensing voltage, from the pixel during the first sensing period; supplying a second sensing data signal corresponding to a second grayscale, the first power having a second sensing voltage, and the reference voltage to the pixel during a second sensing period; sensing a second sensing current, generated based on the second sensing voltage, from the pixel during the second sensing period; and calculating, for a sensing circuit, characteristics of a driving transistor of the pixel using the first sensing current and the second sensing current. The first sensing data signal and the second sensing data signal may be different from each other, and the first sensing voltage and the second sensing voltage may be different from each other.

According to an embodiment, mobility characteristics and threshold voltage characteristics of the characteristics of the driving transistor may be calculated based on the first sensing current and the second sensing current.

According to an embodiment, the first sensing data signal may be greater than the second sensing data signal, and the first sensing voltage may be greater than the second sensing voltage.

According to an embodiment, the method may further include compensating for input image data based on the calculated characteristics of the driving transistor.

Advantageous Effects

A display device and a method of driving the display device according to embodiments of the present disclosure may change the voltage level of first power that is supplied to a drain electrode of a driving transistor based on a grayscale value for current sensing, during external compensation driving. Therefore, a channel length modulation effect of a driving transistor is reflected in image data compensation, so that a compensation error may be greatly decreased, and image quality may be improved.

However, the advantages of the present disclosure are not limited to the foregoing advantages, and may be expanded in various forms without departing from the spirit and scope of the present disclosure.

MODE FOR INVENTION

Figure 1:
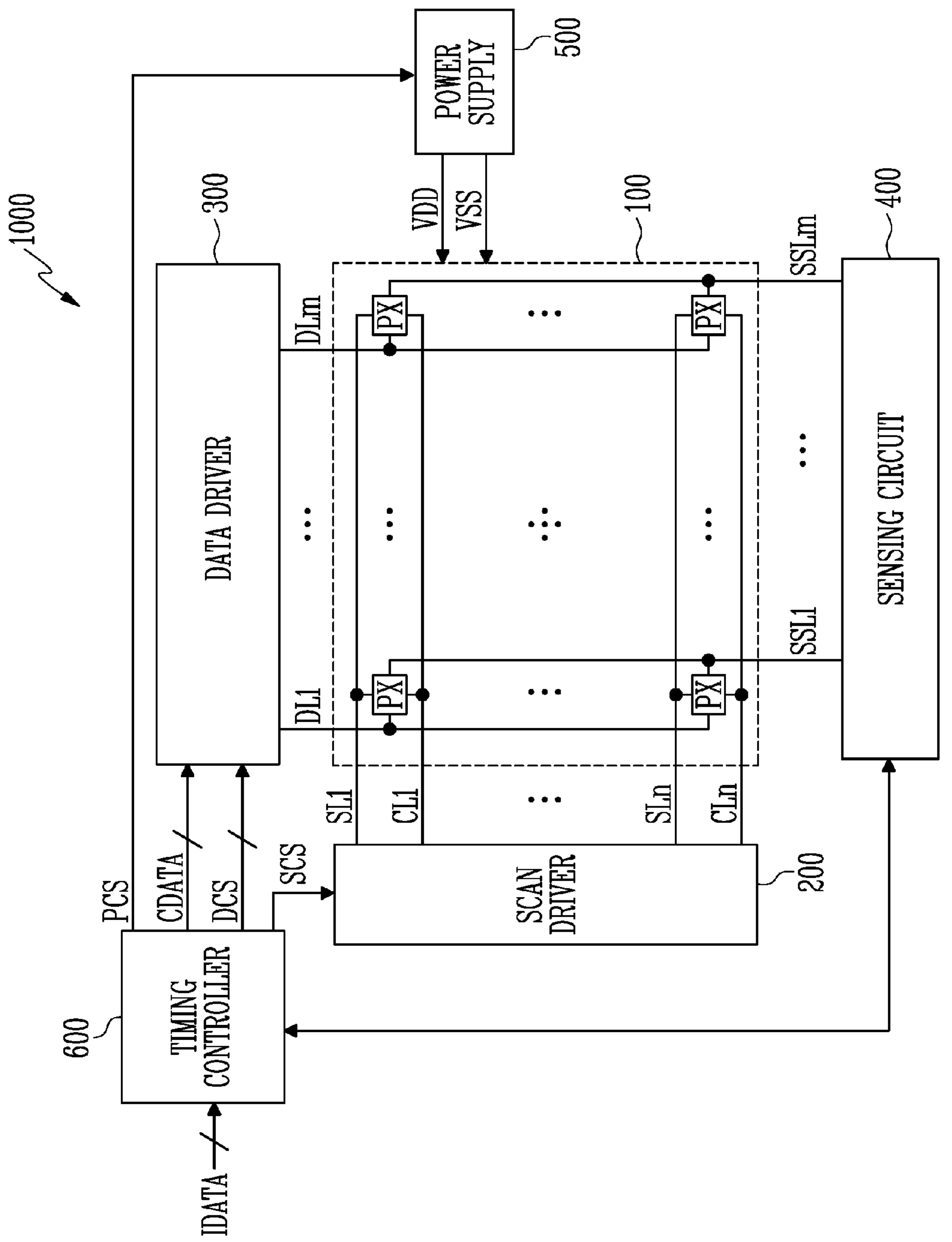
FIG. 1 is a block diagram illustrating a display device according to embodiments of the present disclosure.

Hereinafter, embodiments of the present disclosure will be described in detail with reference to the accompanying drawings. The same reference numerals are used to designate the same or similar components throughout the drawings, and repeated descriptions thereof will be omitted.

FIG. 1 is a block diagram illustrating a display device according to embodiments of the present disclosure.

Referring to FIG. 1, a display device 1000 may include a pixel part 100, a scan driver 200, a data driver 300, a sensing circuit 400, a power supply 500, and a timing controller 600.

The display device 1000 may be a flat panel display device, a flexible display device, a curved display device, a foldable display device, or a bendable display device. Also, the display device may be applied to a transparent display device, a head-mounted display device, a wearable display device, or the like. Further, the display device 1000 may be applied to various electronic devices, such as a smartphone, a tablet, a smart pad, a television ("TV"), and a monitor.

Meanwhile, the display device 1000 may be implemented as an organic light-emitting display device, a liquid crystal display device, or the like. However, this configuration is only an example, and the configuration of the display device 1000 is not limited thereto. For example, the display device 1000 may be a self-emissive display device including an inorganic light-emitting element.

In an embodiment, the display device 1000 may be driven while the period thereof is divided into a display period during which an image is displayed and a sensing period during which the characteristics of driving transistors included in respective pixels PX are sensed.

The pixel part 100 may include pixels PX disposed to be coupled to data lines DL1 to DLm (where m is a natural number), scan lines SL1 to SLn (where n is a natural number), control lines CL1 to CLn, and sensing lines SSL1 to SSLm. The voltages of first power VDD and second power VSS may be supplied to the pixels PX from outside.

Meanwhile, although, in FIG. 1, n scan lines SL1 to SLn are illustrated, the present disclosure is not limited thereto. For example, in accordance with the circuit structure of each pixel PX, one or more control lines, scan lines, emission control lines, sensing lines, etc. may be additionally formed in the pixel part 100.

In an embodiment, transistors included in each pixel PX may be N-type oxide Thin Film Transistors ("TFTs"). For example, such an oxide TFT may be a low-temperature polycrystalline oxide ("LTPO") TFT. However, this is only an example, and N-type transistors are not limited thereto. For example, an active pattern (semiconductor layer) included in each transistor may include an inorganic semiconductor (e.g., amorphous silicon or polysilicon), an organic semiconductor, etc. Also, at least one of the transistors included in the display device 1000 may be replaced with a P-type transistor.

The timing controller 600 may generate a data driving control signal DCS, a scan driving control signal SCS, and a power driving control signal PCS in response to externally supplied synchronization signals. The data driving control signal DCS generated by the timing controller 600 may be supplied to the data driver 300, the scan driving control signal SCS may be supplied to the scan driver 200, and the power driving control signal PCS may be supplied to the power supply 500.

Further, the timing controller 600 may supply compensated image data CDATA to the data driver 300 based on externally supplied input image data IDATA.

The data driving control signal DCS may include a source start signal and clock signals. The source start signal may control a time point at which the sampling of data starts. The clock signals may be used to control a sampling operation.

The scan driving control signal SCS may include a scan start signal, a control start signal, and clock signals. The scan start signal may control the timing of scan signals. The control start signal may control the timing of control signals. The clock signals may be used to shift the scan start signal and/or the control start signal.

The power driving control signal PCS may control the supply of the voltages of the first power VDD and the second power VSS and the levels of voltages.

The timing controller 600 may further control the operation of the sensing circuit 400. For example, the timing controller 600 may control the timing at which a reference voltage is supplied to the pixels PX through the sensing lines SSL1 to SSLm and/or the timing at which currents generated in the pixels PX are sensed through the sensing lines SSL1 to SSLm.

The scan driver 200 may receive the scan driving control signal SCS from the timing controller 600. The scan driver 200 having received the scan driving control signal SCS may supply the scan signals to the scan lines SL1 to SLn, and may supply control signals to the control lines CL1 to CLn.

For example, the scan driver 200 may sequentially supply the scan signals to the scan lines SL1 to SLn. When the scan signals are sequentially supplied to the scan lines SL1 to SLn, the pixels PX may be selected on a horizontal line basis. For this operation, each scan signal may be set to a gate-on voltage (e.g., a logic high level) so that a transistor included in the corresponding pixel PX is turned on.

Similarly, the scan driver 200 may sequentially supply the control signals to the control lines CL1 to CLn. The control signals may be used to sense (or extract) driving currents flowing through the pixels (i.e., currents flowing through the driving transistors). The timings and waveforms at which the scan signals and the control signals are supplied may be set differently depending on the display period and the sensing period.

Meanwhile, although, in FIG. 1, a single scan driver 200 is illustrated as outputting both scan signals and control signals, the present disclosure is not limited thereto. For example, the scan driver 200 may include a first scan driver which supplies scan signals to the pixel part 100 and a second scan driver which supplies control signals to the pixel part 100.

The data driver 300 may receive the data driving control signal DCS from the timing controller 600. The data driver 300 may supply data signals (e.g., sensing data signals) for detecting pixel characteristics to the pixel part 100 during the sensing period. The data driver 300 may supply data signals for displaying an image to the pixel part 100 based on the compensated image data CDATA during the display period.

The sensing circuit 400 may generate compensation values for compensating for the characteristic values of the pixels PX based on sensing values (i.e., sensing currents) provided from the sensing lines SSL1 to SSLm. For example, the sensing circuit 400 may detect and compensate for a change in the threshold voltage of the driving transistor included in each pixel PX, a change in the mobility of the driving transistor, and a change in the characteristics of a light-emitting element.

In an embodiment, the sensing circuit 400 may detect a first sensing current IS1 corresponding to a first grayscale during a first sensing period, and may detect a second sensing current IS2 corresponding to a second grayscale during a second sensing period. Here, the first grayscale may be a first test grayscale for current sensing, and the second grayscale may be a second test grayscale different from the first grayscale.

The sensing circuit 400 may simultaneously calculate threshold voltage characteristics and mobility characteristics of each pixel PX using an operation on the first sensing current IS1 and the second sensing current IS2, and may compensate for image data of the corresponding pixel PX based on the calculated characteristics. A compensation scheme according to embodiments of the present disclosure, which performs external compensation on the pixel PX using the sensing currents corresponding to the two grayscales, may be defined as a 2-point current sensing scheme.

In an embodiment, the sensing circuit 400 may supply a predetermined reference voltage to the pixels PX through the sensing lines SSL1 to SSLm and receive currents or voltages extracted from the pixels PX during the sensing period. The extracted currents or voltages may correspond to the sensing values, and the sensing circuit 400 may detect the change in the characteristics of driving transistors based on the sensing values. The sensing circuit 400 may calculate compensation values for compensating for the input image data IDATA based on the detected characteristic change. The compensation values may be provided to the timing controller 600 or the data driver 300.

During the display period, the sensing circuit 400 may supply a predetermined reference voltage for displaying an image to the pixel part 100 through the sensing lines SSL1 to SSLm.

Although, in FIG. 1, the sensing circuit 400 is illustrated as being a component separate from the timing controller 600, at least some of the components of the sensing circuit 400 may be included in the timing controller 600. For example, the sensing circuit 400 and the timing controller 600 may be formed in a single driver Integrated Circuit ("IC"). Furthermore, the data driver 300 may also be included in the timing controller 600. Therefore, at least some of the sensing circuit 400, the data driver 300, and the timing controller 600 may be formed in a single driver IC.

The power supply 500 may supply the voltage of the first power VDD and the voltage of the second power VSS to the pixel part 100 in response to the power driving control signal PCS. In an embodiment, the first power VDD may be used to determine a drain voltage of the driving transistor, and the second power VSS may be used to determine a cathode voltage of the light-emitting element.

In an embodiment, the power supply 500 may change the voltage of the first power VDD that is supplied to the pixels PX during the sensing period. For example, the power supply 500 may change the voltage of the first power VDD so that a channel length modulation effect of the driving transistor is reflected in an operation of sensing the characteristics of the driving transistor and a compensation operation for the driving transistor.

Below, a compensation scheme in which the channel length modulation effect is reflected will be described in detail.

Figure 2:
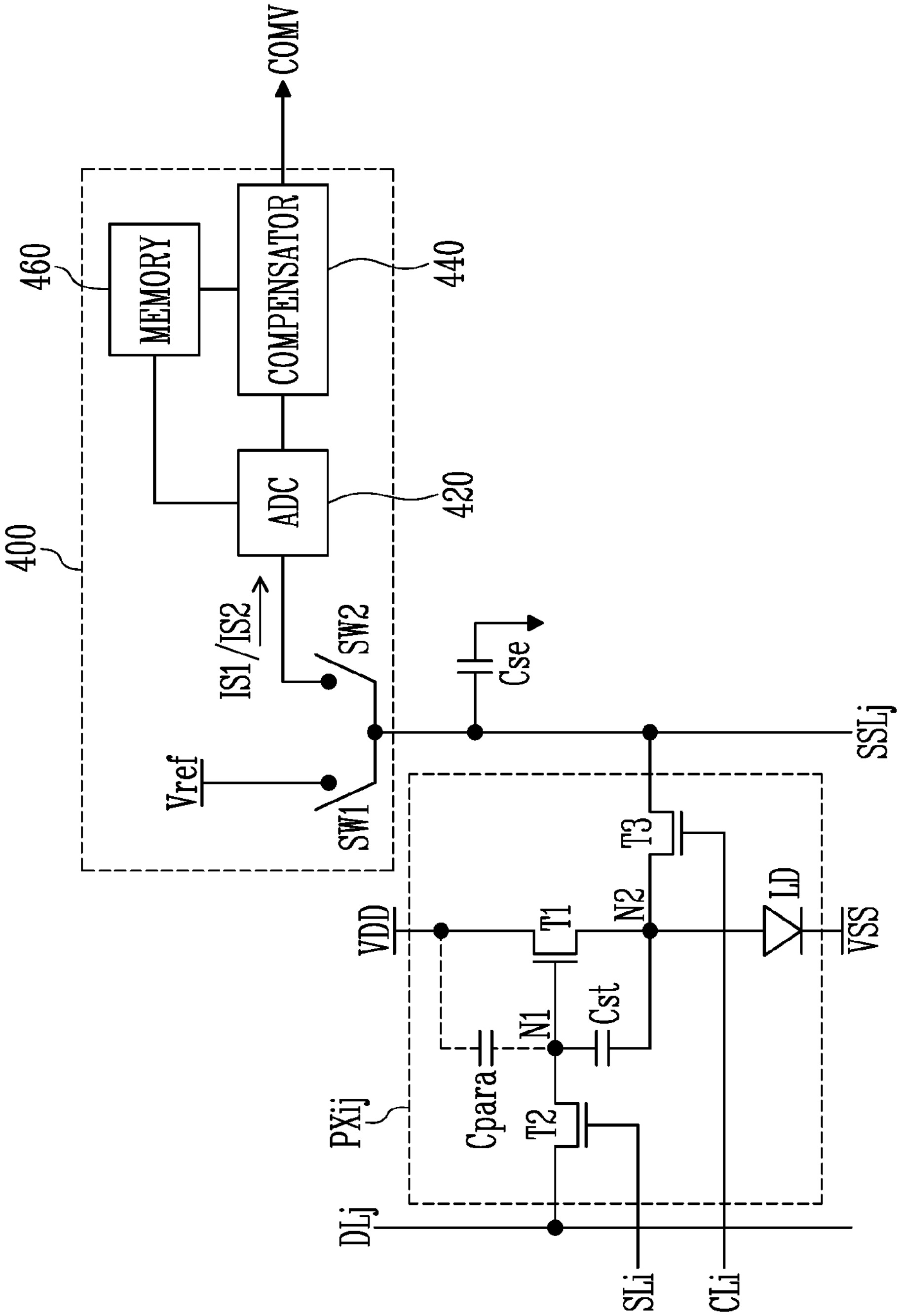
FIG. 2 is a diagram illustrating an example of a pixel and a sensing circuit included in the display device of FIG. 1.

FIG. 2 is a diagram illustrating an example of a pixel and a sensing circuit included in the display device of FIG. 1.

In FIG. 2, for the convenience of description, a pixel which is located on an i-th horizontal line and is connected to a j-th data line DLj is illustrated.

Referring to FIG. 2, a pixel PXij may include a light-emitting element LD, a first transistor T1 (i.e., a driving transistor), a second transistor T2, a third transistor T3, and a storage capacitor Cst.

A first electrode (an anode electrode or a cathode electrode) of the light-emitting element LD is connected to a second node N2, and a second electrode (a cathode electrode or an anode electrode) of the light-emitting element LD is connected to the source of the second power VSS. The light-emitting element LD may generate light with predetermined luminance in accordance with the amount of current supplied from the first transistor T1.

A first electrode of the first transistor T1 may be connected to the source of first power VDD, and a second electrode of the first transistor T1 may be connected to the first electrode of the light-emitting element LD. A gate electrode of the first transistor T1 may be connected to a first node N1. The first transistor T1 controls the amount of current flowing into the light-emitting element LD in accordance with the voltage of the first node N1.

A first electrode of the second transistor T2 may be connected to the data line DLj, and a second electrode of the second transistor T2 may be connected to the first node N1. A gate electrode of the second transistor T2 may be connected to a scan line SLi. When a scan signal is supplied through the scan line SLi, the second transistor T2 may be turned on, and may then transfer a data signal from the data line DLj to the first node N1.

The third transistor T3 may be connected between a sensing line SSLj and the second electrode (i.e., the second node N2) of the first transistor T1. A gate electrode of the third transistor T3 may be connected to a control line CLi. When a control signal is supplied through the control line CLi, the third transistor T3 may be turned on, and may then electrically couple the sensing line SSLj and the second node N2 (i.e., the second electrode of the first transistor T1) to each other.

In an embodiment, when the third transistor T3 is turned on, a reference voltage may be supplied to the second node N2. In another embodiment, when the third transistor T3 is turned on, a current generated in the first transistor T1 may be supplied to the sensing circuit 400.

The storage capacitor Cst may be connected between the first node N1 and the second node N2. The storage capacitor Cst may store a voltage corresponding to a voltage difference between the first node N1 and the second node N2.

Meanwhile, in an embodiment of the present disclosure, the circuit structure of the pixel PXij is not limited by FIG. 2. For example, the light-emitting element LD may be interposed between the source of the first power VDD and the first electrode of the first transistor T1 in another embodiment.

Further, a parasitic capacitor Cpara may be formed between the gate electrode (i.e., the first node N1) and the drain electrode of the first transistor T1.

In an embodiment, the sensing circuit 400 connected to the sensing line SSLj may include a first switch SW1, a second switch SW2, an analog-to-digital converter ("ADC") 420, a compensator 440, and a memory 460.

The first switch SW1 and the second switch SW2 may be alternately turned on. When the first switch SW1 is turned on, a reference voltage Vref may be supplied to the second node N2. Therefore, the voltage of the second node N2 (i.e., the source voltage of the first transistor T1) may be initialized to the reference voltage Vref.

When the second switch SW2 is turned on, a sensing current of the pixel PXij may flow into the sensing circuit 400.

The analog-to-digital converter (ADC) 420 may sense a voltage from the sensing current of the sensing line SSLj, convert the value of the sensing voltage into a digital value, and output the digital value as sensing data. In an embodiment, the output sensing data may be stored in the memory 460. For example, a first sensing current IS1 in a first sensing period may be converted into first sensing data, and a second sensing current IS2 in a second sensing period may be converted into second sensing data.

The compensator 440 may perform an operation on the first sensing data and the second sensing data, and may then simultaneously calculate the mobility characteristics and the threshold voltage characteristics of the first transistor T1. The compensator 440 may determine a compensation value COMV for the input image data IDATA based on the mobility characteristics and the threshold voltage characteristics of the first transistor T1.

The memory 460 may store at least one of the first sensing data and the second sensing data. In an embodiment, the memory 460 may further include a lookup table or the like for required for image data compensation.

Meanwhile, although, in FIG. 2, the transistors T1 to T3 are illustrated as being NMOS transistors, the present disclosure is not limited thereto. For example, at least one of the transistors T1 to T3 may be implemented as a PMOS transistor in another embodiment.

Figure 3:
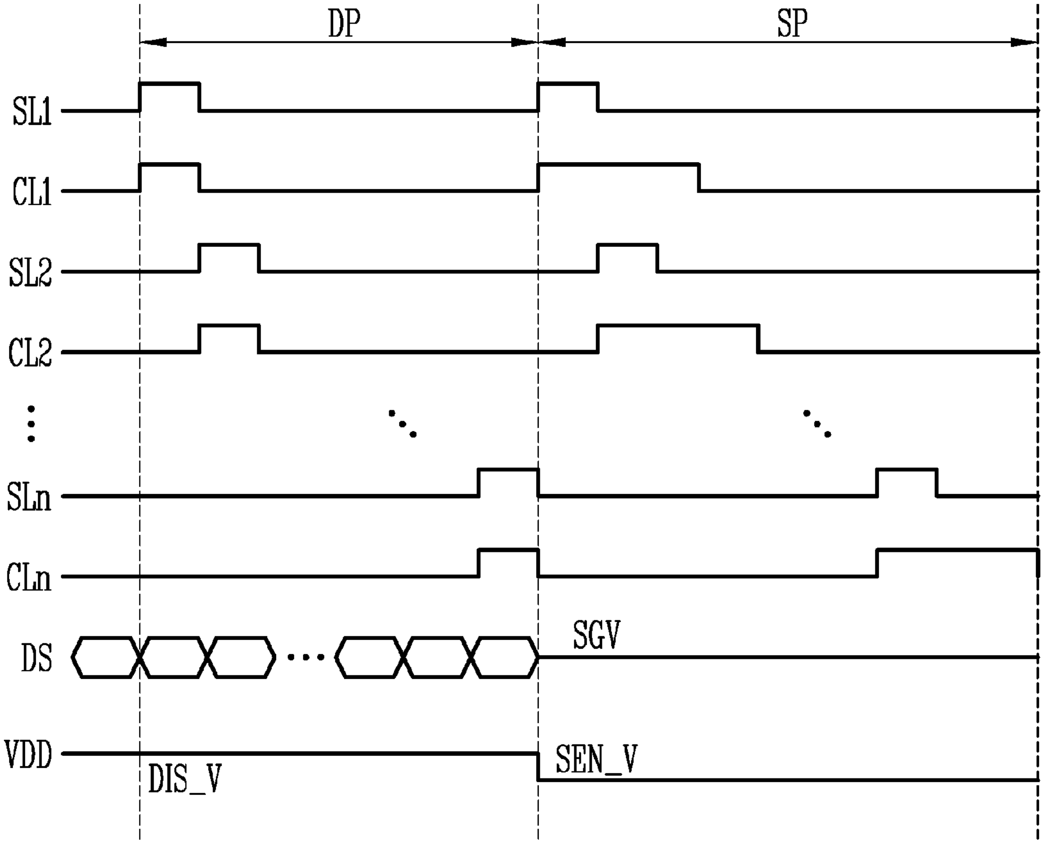
FIG. 3 is a timing diagram illustrating an example of the operation of the display device of FIG. 1.

FIG. 3 is a timing diagram illustrating an example of the operation of the display device of FIG. 1.

Referring to FIGS. 1 to 3, the display device 1000 may be driven such that the period of the display device 1000 is divided into a display period DP during which an image is displayed and a sensing period SP during which the characteristics of the first transistor T1 included in each pixel PX are sensed.

In an embodiment, during the sensing period SP, image data may be compensated for based on the sensed characteristic information.

During the display period DP, the first switch SW1 may be turned on, and the second switch SW2 may be set to a turned-off state. Therefore, a reference voltage Vref, which is a constant voltage, may be supplied to sensing lines SSL1 to SSLm.

During the display period DP, the scan driver 200 may sequentially supply scan signals to the scan lines SL1 to SLn. Also, during the display period DP, the scan driver 200 may sequentially supply control signals to the control lines CL1 to CLn.

For an i-th horizontal line, a scan signal and a control signal may be supplied at substantially the same time. Therefore, the second transistor T2 and the third transistor T3 may be simultaneously turned on or off.

When the second transistor T2 is turned on, an image data signal DS corresponding to image data may be supplied to the first node N1. When the third transistor T3 is turned on, the reference voltage Vref may be supplied to the second node N2. Therefore, the storage capacitor Cst may store a voltage corresponding to a voltage difference between the image data signal DS and the reference voltage Vref.

Here, since the reference voltage Vref is set to a constant voltage, the voltage stored in the storage capacitor Cst may be stably determined by the image data signal DS.

When the supply of the scan signal and the control signal to the i-th scan line SLi and the i-th control line CLi is stopped, the second transistor T2 and the third transistor T3 may be turned off.

Thereafter, the first transistor T1 may control the amount of current (driving current) supplied to the light-emitting element LD in accordance with the voltage stored in the storage capacitor Cst. Therefore, the light-emitting element LD may emit light with luminance corresponding to the driving current of the first transistor T1.

In an embodiment, during the display period DP, the power supply 500 may output first power VDD having a display voltage DIS V. During the display period DP, the first power VDD may be output in the form of a constant voltage. The display voltage DIS V may have a typical voltage level to be applied for image displaying. Furthermore, the display voltage DIS V may have a constant voltage level regardless of the grayscale of an image and the magnitude (voltage level) of a data signal.

In an embodiment, during the sensing period SP, the scan driver 200 may sequentially supply scan signals to the scan lines SL1 to SLn. Also, during the display period DP, the scan driver 200 may sequentially supply control signals to the control lines CL1 to CLn.

In an embodiment, the duration length of the control signals supplied during the sensing period SP may be longer than the duration length of the control signals supplied during the display period DP. Also, during the sensing period SP, a time duration of the control signal supplied to an i-th control line CLi may partially overlap a scan signal supplied to an i-th scan line SLi. The duration length of the control signal may be greater than the duration length of the scan signal. For example, the control signal supplied to the i-th control line CLi starts to be supplied simultaneously with the scan signal supplied to the i-th scan line SLi, and may be supplied for a time longer than that of the scan signal.

When the scan signal and the control signal are simultaneously supplied, the second and third transistors T2 and T3 are turned on. Here, the first switch SW1 is in a turned-on state. When the second transistor T2 is turned on, a sensing data signal SGV (or a data voltage) for sensing may be supplied to the first node N1. Simultaneously with the supply of the sensing data signal SGV, the reference voltage Vref may be supplied to the second node N2 by the turn-on operation of the third transistor T3. Therefore, the storage capacitor Cst may store a voltage corresponding to a voltage difference between the sensing data signal SGV and the reference voltage Vref.

Thereafter, when the supply of the scan signal is stopped, the second transistor T2 may be turned off. When the second transistor T2 is turned off, the first node N1 may float. Accordingly, the voltage of the second node N2 increases, and a sensing current is generated through the first transistor T1. While the voltage increases, the sensing current flows through the sensing line SSLj, and the sensing capacitor Cse may be charged. The speed at which the voltage increases may vary with the current capability of the first transistor T1, that is, mobility of the first transistor T1.

Further, voltage distribution occurs between the storage capacitor Cst and the parasitic capacitor Cpara due to the parasitic capacitor Cpara, and the gate-source voltage of the first transistor T1 may be unintentionally changed. Therefore, during a compensation operation, compensation for a voltage drop attributable to the parasitic capacitor Cpara may also be performed.

After the voltage has increased for a preset time, the second switch SW2 may be turned on, and thus the sensing line SSLj may be connected to the analog-to-digital converter 420 of the sensing circuit 400. Accordingly, the analog-to-digital converter 420 may generate digital code corresponding to the voltage (i.e., the voltage corresponding to the sensing current) charged in the sensing capacitor Cse.

In an embodiment, during the sensing period SP, the power supply 500 may output the first power VDD having a sensing voltage SEN V so as to calculate characteristics.

In the display device 1000 to which the 2-point current sensing scheme is applied, channel length modulation occurs depending on the magnitude of the gate voltage of the first transistor T1, and thus the value of the actual sensing current may have errors of different rates depending on the grayscale. Accordingly, an error in the sensing data occurs, and a greater degradation compensation error may appear especially in a low-grayscale area. In order to overcome such a compensation error, the voltage level of the first power VDD may be changed during the sensing period SP so that a channel length modulation effect is reflected in a compensation operation.

Accordingly, the compensation error occurring in the external compensation scheme may be greatly reduced, compensation efficiency may be maximized, and image quality may be improved.

In accordance with an embodiment, the sensing period SP may be performed at least once before the display device 1000 is released. In this case, initial characteristic information of first transistors T1 may be stored before the display device 1000 is released, and the input image data IDATA may be compensated for using the characteristic information, and thus the pixel part 100 may display an image having uniform image quality.

Also, the sensing period SP may be executed at intervals of a predetermined period even while the display device 1000 is actually used. For example, the sensing period SP may be arranged in part of a time during which the display device 1000 is turned on and/or off. Then, even if the characteristics of the first transistor T1 in each of the pixels PX are changed in accordance with the usage of the display device, the characteristic information may be updated in real time, and may then be reflected in the generation of a data signal. However, this is only an example, and the sensing period SP may be inserted between predetermined display periods DP. Therefore, the pixel part 100 may continuously display images having uniform image quality.

Figure 4:
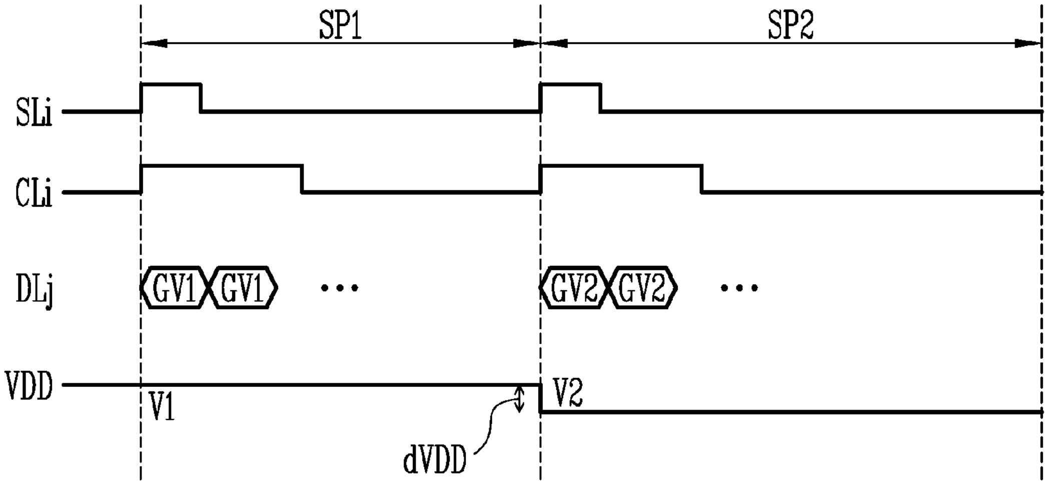
FIG. 4 is a timing diagram illustrating an example of the operation of the display device of FIG. 1 during a sensing period.

FIG. 4 is a timing diagram illustrating an example of the operation of the display device of FIG. 1 during a sensing period.

Referring to FIGS. 2 to 4, the sensing period SP may include a first sensing period SP1 and a second sensing period SP2.

Current sensing schemes in the first sensing period SP1 and the second sensing period SP2 may be substantially the same as each other.

During the first sensing period SP1, a first sensing data signal GV1 corresponding to a first grayscale may be supplied to the data line DLj. Here, the power supply 500 may supply the first power VDD, as a first sensing voltage V1 corresponding to the first grayscale, to the pixel part 100.

A first sensing current IS1 may be generated and extracted based on the first sensing data signal GV1 and the first sensing voltage V1.

During the second sensing period SP2, a second sensing data signal GV2 corresponding to a second grayscale may be supplied to the data line DLj. Here, the power supply 500 may supply the first power VDD, as a second sensing voltage V2 corresponding to the second grayscale, to the pixel part 100.

A second sensing current IS2 may be generated and extracted based on the second sensing data signal GV2 and the second sensing voltage V2.

Meanwhile, the first grayscale and the second grayscale may be values that are experimentally set. That is, the first grayscale and the second grayscale may be set to grayscale values that can minimize errors in mobility characteristics and threshold voltage characteristics. For example, when the pixel PX emits within a range of grayscale values ranging from 0 to 255, the first grayscale may be a grayscale value of 224, and the second grayscale value may be a grayscale value of 128. However, these values are only examples, and the first grayscale and the second grayscale according to the invention are not limited thereto.

In an embodiment, a difference dVDD between the first sensing voltage V1 and the second sensing voltage V2 may be a result obtained by reflecting a difference of the channel length modulation effects of the first transistor T1 caused by the difference between the first grayscale and the second grayscale. For example, the difference dVDD may be proportional to the difference between the gate-source voltage of the first transistor depending on the first sensing data signal GV1 and the gate-source voltage of the first transistor T1 depending on the second sensing data signal GV2.

For example, when the first sensing data signal GV1 is greater than the second sensing data signal GV2, the first sensing voltage V1 may be greater than the second sensing voltage V2.

Accordingly, a sensing error caused by the channel length modulation effect may be eliminated or minimized, and thus a degradation compensation error may be removed.

Figure 5:
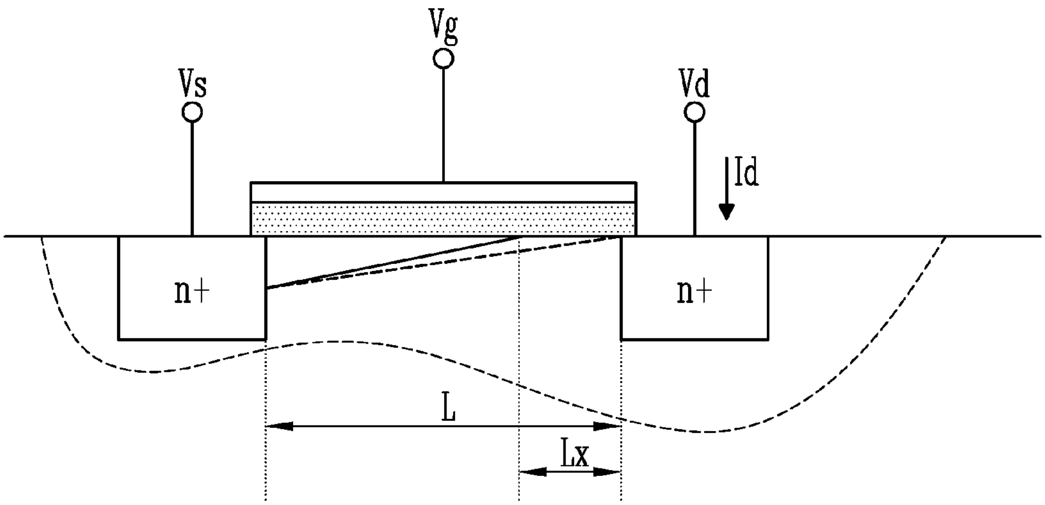
FIG. 5 is a diagram for explaining a channel length modulation effect occurring in a first transistor included in a pixel of FIG. 2.
Figure 6:
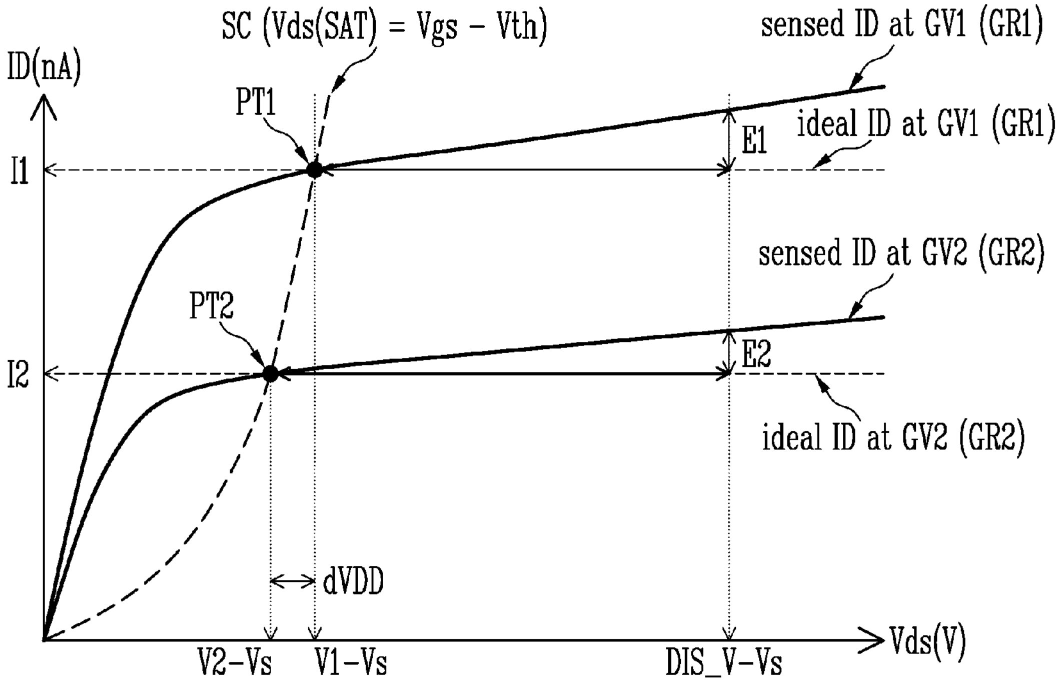
FIG. 6 is a diagram for explaining an example in which the voltage of first power is adjusted by reflecting a channel length modulation effect.

FIG. 5 is a diagram for explaining a channel length modulation effect occurring in a first transistor included in the pixel of FIG. 2, and FIG. 6 is a diagram for explaining an example in which the voltage of first power is adjusted in consideration of the channel length modulation effect. FIG. 6 shows graphs illustrating driving current (nanoamperes: nA) versus drain-source voltage (voltages: v).

Referring to FIGS. 2, 4, 5, and 6, when the drain-source voltage Vds of the first transistor T1 becomes equal to the difference between the gate-source voltage Vgs and the threshold voltage Vth (i.e., Vds=Vgs−Vth) of the first transistor T1, the first transistor T1 may be operated in a saturated state.

Meanwhile, as illustrated in FIG. 6, it is generally assumed that a driving current ID is constant regardless of the drain-source voltage Vds in a saturated state.

Therefore, the driving current ID (or a drain current) in the saturated state may be determined to be different values depending on the magnitude of the gate voltage Vg of the first transistor T1. For example, when a first sensing data signal GV1 corresponding to a first grayscale GR1 is supplied to the gate electrode of the first transistor T1, a first driving current I1 theoretically flows in the saturated state. When a second sensing data signal GV2 corresponding to a second grayscale GR2 is supplied to the gate electrode of the first transistor T1, a second driving current I2 theoretically flows in the saturated state.

However, actually, an effective channel length L of the first transistor T1 may be operated as if it were modulated (varied) depending on the drain voltage Vd (i.e., a drain-source voltage Vds). That is, when the drain-source voltage Vds increases, a depletion region increases, with the result that the effective channel length L decreases. When the effective channel length L is shortened, the movement distance of a carrier is shortened, and thus the driving current ID increases. This is called a channel length modulation effect.

Such a channel length modulation effect influences the driving current ID, as shown in the following [Equation 1].

$$ID=\frac{1}{2}\beta(Vgs-Vth)^2(1+\lambda Vds) \quad \text{Equation 1}$$

Here, ID denotes the driving current, β denotes a variable including mobility characteristics, Vgs denotes the gate-source voltage, Vth denotes a threshold voltage, and λVds denotes the ratio of an effective channel length variation Lx to the effective channel length L (i.e., Lx/L).

Therefore, when the voltage of the first power VDD is supplied as the display voltage DIS V which is a sufficiently high voltage, as illustrated in FIG. 6, the first driving current I1 and the second driving current I2 may be increased from theoretical values.

Further, since the drain-source voltage Vds that is saturated varies depending on the magnitude of the gate voltage Vg, the effective channel length variation Lx depending on the gate voltage Vg changes for the same drain-source voltage Vds. Therefore, when the display voltage DIS V of the first power VDD is supplied as the drain voltage Vd, an error in the first driving current I1 for a theoretical value (e.g., a first error E1) may differ from an error in the second driving current I2 for a theoretical value (e.g., a second error E2). For example, the first error E1 in which the channel length modulation effect is reflected more may be greater than the second error E2.

Therefore, in the 2-point current sensing scheme in which the channel length modulation effect is not reflected in external compensation of the pixel PX, a compensation error inevitably occurs.

The display device 1000 according to embodiments of the present disclosure reflects the first error E1 and the second error E2 in current sensing. That is, in order to cancel the channel length modulation effect in which the driving current ID rises, the voltage of the first power VDD, which is the drain voltage Vd, may be set differently depending on the first grayscale GR1 and the second grayscale GR2 for sensing.

The drain voltage Vd may be adjusted such that the first driving current I1 and the second driving current I2 are output as values corresponding to a saturation state curve SC depending on the gate voltage Vg. That is, the voltage of the first power VDD for detecting the first driving current I1 may be determined to be the first sensing voltage V1, and the voltage of the first power VDD for detecting the second driving current I2 may be determined to be the second sensing voltage V2. For example, as illustrated in FIG. 6, the first sensing voltage V1 and the second sensing voltage V2 may be determined based on a first point PT1 and a second point PT2 corresponding to the saturation state curve SC.

Here, because the difference between the first error E1 and the second error E2 only needs to be removed, the voltage difference dVDD between the first sensing voltage V1 and the second sensing voltage V2 may be determined based on the gate voltage Vg in a saturated state. That is, the difference dVDD between the first sensing voltage V1 and the second sensing voltage V2 may be a result obtained by reflecting the difference between channel length modulation effects of the first transistor T1 depending on the difference between the first grayscale GR1 and the second grayscale GR2. In an embodiment, the relationship between the first sensing voltage V1 and the second sensing voltage V2 may be represented by the following [Equation 2]:

$$V2=V1-(Vgs_1-Vgs_2) \qquad \text{Equation 2}$$

Here, Vgs may be a gate-source voltage Vgs corresponding to the first grayscale GR1, and Vgs 2 may be a gate-source voltage Vgs corresponding to the second grayscale GR2. Because the source voltage Vs is a constant voltage, the voltage difference dVDD between the first sensing voltage V1 and the second sensing voltage V2 may be determined depending on the change in the gate voltage Vg. That is, the difference dVDD between the first sensing voltage V1 and the second sensing voltage V2 may be proportional to the difference between the gate-source voltage Vgs of the first transistor T1 corresponding to the first sensing data signal GV1 and the gate-source voltage Vgs 2 of the first transistor T1 corresponding to the second sensing data signal GV2.

For example, the second sensing voltage V2 may be set to 9.5 V when the first sensing data signal GV1 is 3 V corresponding to a grayscale value of 196, the second sensing data signal GV2 is 2.5 V corresponding to a grayscale value of 128, and the first sensing voltage V1 is 10 V. However, this is only an example, and the first sensing voltage V1 may be equal to the display voltage DIS V. Here, the second sensing voltage V2 may be less than the first sensing voltage V1.

As described above, when external compensation driving is performed, the first power VDD having the first sensing voltage V1 may be supplied during a first sensing period SP1, and the first power VDD having the second sensing voltage V2 may be supplied during a second sensing period SP2. Therefore, the channel length modulation effect is reflected in image data compensation, so that a compensation error may be greatly decreased, and image quality may be improved.

Figure 7:
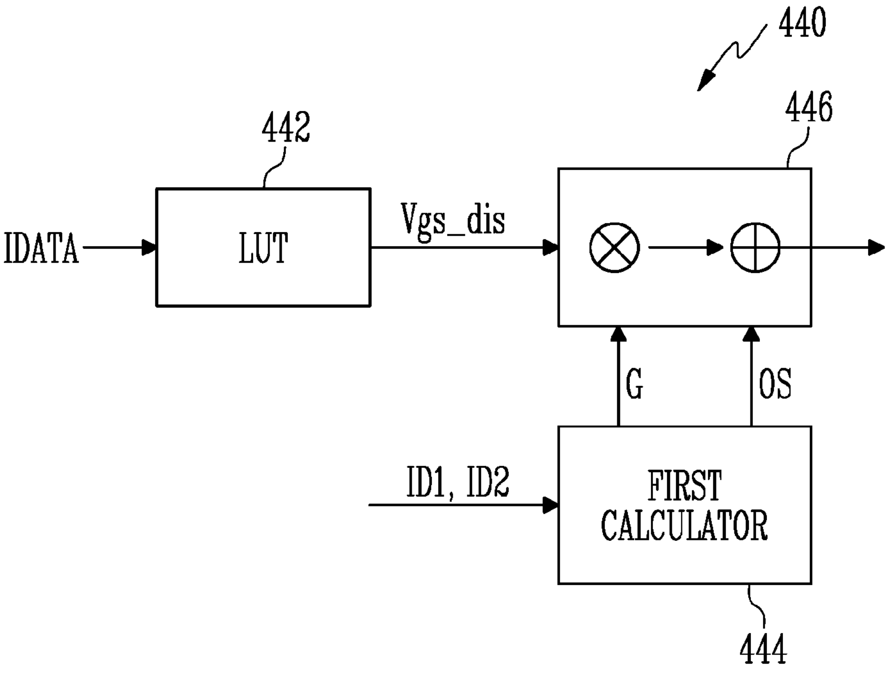
FIG. 7 is a block diagram illustrating an example of a compensator included in the sensing circuit of the display device of FIG. 1.

FIG. 7 is a block diagram illustrating an example of the compensator included in the sensing circuit of the display device of FIG. 1.

Referring to FIGS. 1 to 7, a compensator 440 may include a lookup table 442, a first calculator 444, and a second calculator 446.

The compensator 440 may perform an operation on first sensing data ID1 and second sensing data ID2, and may then calculate the mobility characteristics and threshold voltage characteristics of the first transistor T1. The compensator 440 may determine a compensation value COMV for input image data IDATA based on the calculated mobility characteristics and threshold voltage characteristics.

During image displaying and sensing, a source voltage Vs is fixed at a reference voltage Vref, and thus degradation of the first transistor T1 may be compensated for by adjusting the gate voltage of the first transistor T1 for a predetermined grayscale.

That is, the compensation value COMV may be a value for adjusting a data signal corresponding to the predetermined grayscale (i.e., a voltage supplied to the gate electrode of the first transistor T1).

The lookup table 442 may output a first gate-source voltage Vgs_dis corresponding to the input image data IDATA. For example, the lookup table 442 may include a digital-to-analog converter ("DAC"). Further, the lookup table may be updated with the relationship between new input image data IDATA and the first gate-source voltage Vgs_dis whenever the image data is compensated for.

The first calculator 444 may calculate a gain G and an offset OS for compensating for the first gate-source voltage Vgs_dis based on the first sensing data ID1 and the second sensing data ID2. The first sensing data ID1 may correspond to a first sensing current IS1, and the second sensing data ID2 may correspond to a second sensing current IS2.

The first calculator 444 may calculate the gain G including mobility characteristics and the offset OS including threshold voltage characteristics based on the above-described [Equation 1]. In [Equation 1], the driving current ID may be the first sensing current IS1 or the second sensing current IS2, the gate-source voltage Vgs may be a constant depending on the first sensing data signal GV1 or the second sensing data signal GV2, (1+λVds) may be a value compensated by the voltage level of the first power VDD, and β and Vth may be variables. Therefore, the first calculator 444 may calculate β and Vth through the calculation of two simultaneous equations based on the first sensing current IS1 and the second sensing current IS2. The gain G may include mobility characteristics β, and may be multiplied by the first gate-source voltage Vgs_dis. The offset OS may include threshold voltage (Vth) characteristics, and may be added to the first gate-source voltage Vgs_dis. That is, the first calculator 444 may simultaneously calculate the mobility characteristics β and the threshold voltage (Vth) characteristics of the first transistor T1 using the first and second sensing data ID1 and ID2.

The second calculator 446 may calculate the compensation value COMV for compensating for the first gate-source voltage Vgs_dis. In an embodiment, the second calculator 446 may multiply the gain G by the first gate-source voltage Vgs_dis, and may add the offset OS to a resulting value. Accordingly, the compensation value COMV for one piece of input image data IDATA corresponding to one pixel PX may be calculated. The compensation value COMV may correspond to a voltage obtained by newly updating the first gate-source voltage Vgs_dis. The input image data IDATA may be compensated for to correspond to the voltage of the newly updated data signal based on the compensation value COMV.

In this way, the mobility characteristics β and the threshold voltage (Vth) characteristics of the first transistor T1 may be simultaneously calculated based on the first and second sensing data ID1 and ID2 sensed using the 2-point current sensing scheme, and the image data may then be compensated for.

Figure 8A:
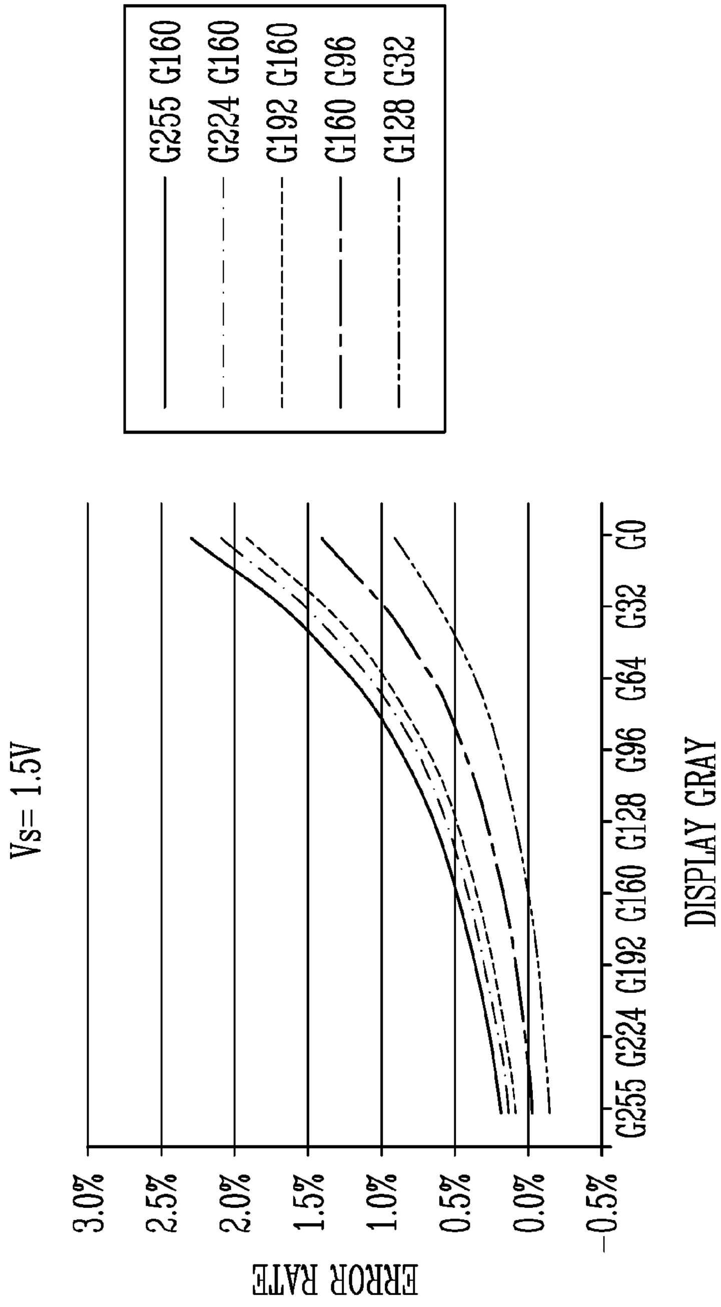
FIG. 8A is a graph schematically illustrating an error rate of external compensation based on conventional 2-point current sensing.
Figure 8B:
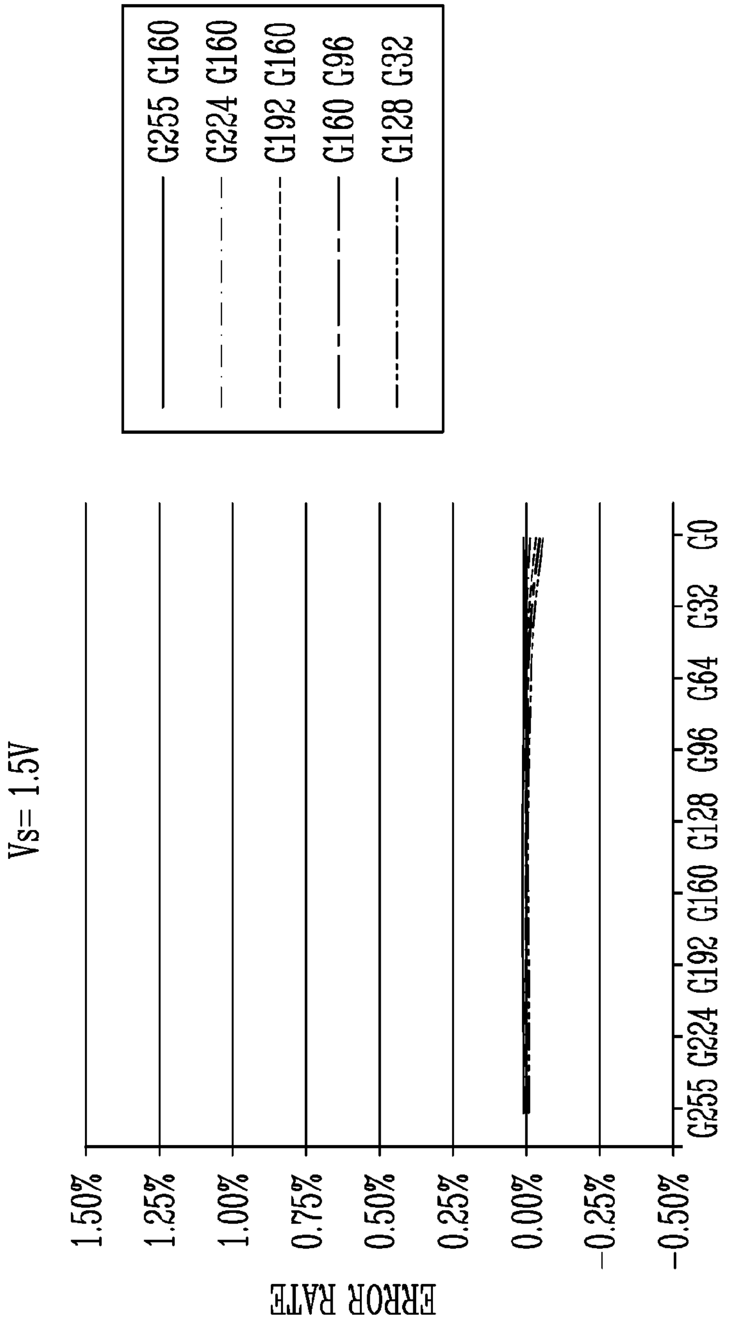
FIG. 8B is a graph schematically illustrating an error rate of an external compensation scheme according to embodiments of the present disclosure.

FIG. 8A is a graph schematically illustrating an error rate of external compensation based on conventional 2-point current sensing, and FIG. 8B is a graph schematically illustrating an error rate of an external compensation scheme according to embodiments of the present disclosure.

Referring to FIGS. 8A and 8B, the error rate of an external compensation scheme based on driving current sensing for first and second grayscales may vary with the value of the first grayscale and the value of the second grayscale.

FIGS. 8A and 8B illustrate the error rate of display grayscale values in the state in which the source voltage of the first transistor T1 is initialized to 1.5 V. A notation of G255, G224, or G192 may indicate a first grayscale and a second grayscale that are set for 2-point current sensing.

As illustrated in FIG. 8A, the error rate of external compensation based on conventional 2-point current sensing may be increased in a direction far away from a measurement grayscale (i.e., the first grayscale and the second grayscale). For example, when the first and second grayscales may have a grayscale value of 255 (G255) and a grayscale value of 128 (G128), an error rate has a greater value in a low-grayscale region farther away from the first and second grayscales than that in a high-grayscale region. Accordingly, compensation capability in the low-grayscale region may be deteriorated, and luminance deviation such as in stains may be perceived. The reason for this is that the difference (error) between driving currents occurring for respective grayscales due to a channel length modulation effect is not reflected in compensation.

The display device 1000 according to embodiments of the present disclosure may reflect the error attributable to the channel length modulation effect in 2-point current sensing. That is, during a first sensing period in which current sensing for the first grayscale is performed, the first power (e.g., VDD of FIG. 1) may have a first sensing voltage, and during a second sensing period in which current sensing for the second grayscale is performed, the first power (e.g., VDD of FIG. 1) may have a second sensing voltage. During the first and second sensing periods, different voltages are supplied to the drain electrode of the first transistor (e.g., T1 of FIG. 2), and thus the error attributable to the channel length modulation effect may be removed or minimized.

Therefore, as illustrated in FIG. 8B, the error rate of external compensation based on 2-point current sensing may be greatly improved. Therefore, degradation compensation efficiency and image quality of pixels and the display device may be improved.

Figure 9:
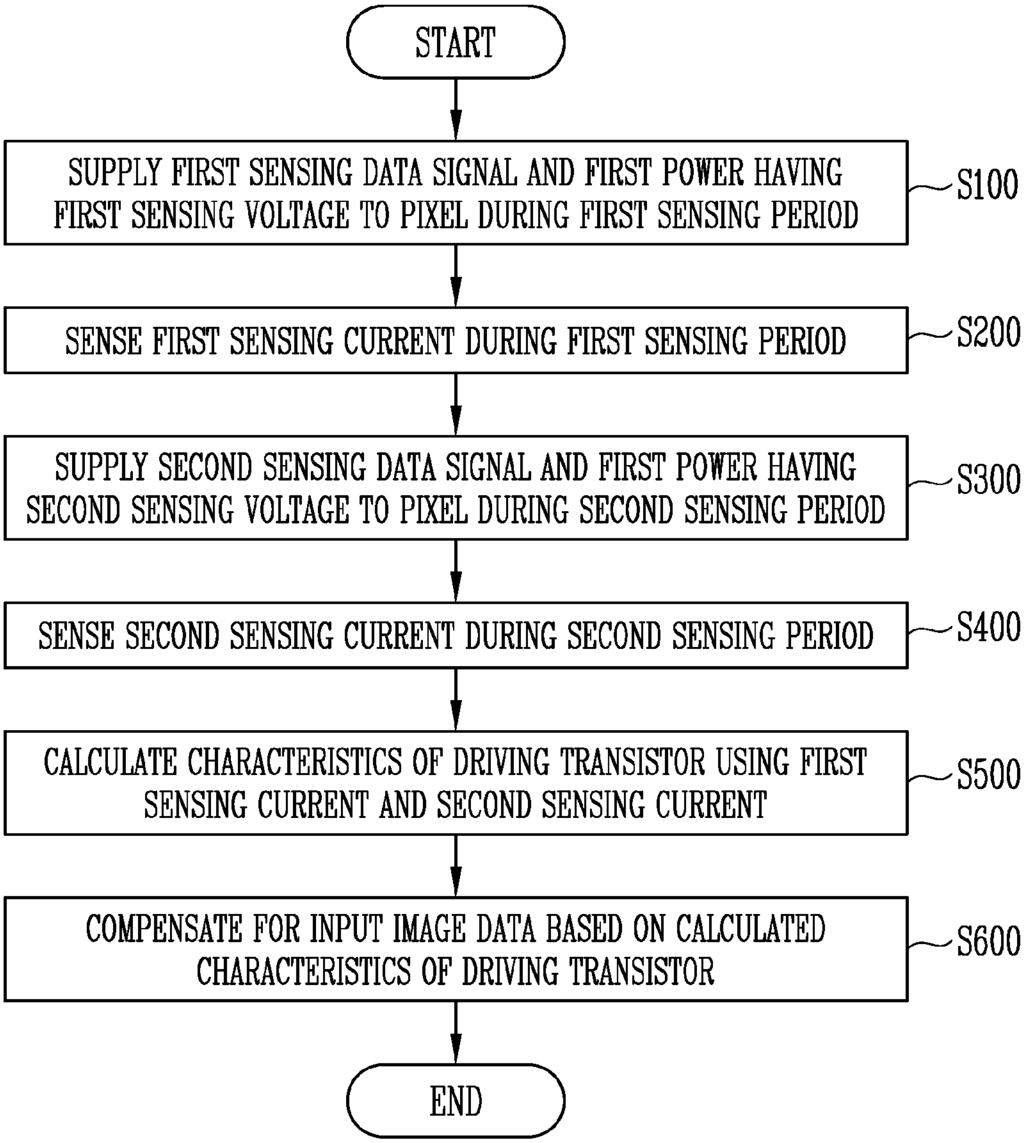
FIG. 9 is a flowchart illustrating a method of driving a display device according to embodiments of the present disclosure.

FIG. 9 is a flowchart illustrating a method of driving a display device according to embodiments of the present disclosure.

Referring to FIG. 9, the method of driving the display device may include the step S100 of supplying a first sensing data signal corresponding to a first grayscale (or a first test grayscale), first power having a first sensing voltage, and a reference voltage to each pixel during a first sensing period, the step S200 of sensing a first sensing current generated based on the first sensing voltage from the pixel during the first sensing period, the step S300 of supplying a second sensing data signal corresponding to a second grayscale (or a second test grayscale), first power having a second sensing voltage, and the reference voltage to the pixel during a second sensing period, and the step S400 of sensing a second sensing current generated based on the second sensing voltage from the pixel. Also, the method of driving the display device may further include the step S500 of calculating the characteristics of a driving transistor of the pixel (e.g., the first transistor T1 of FIG. 2) using the first sensing current and the second sensing current.

In an embodiment, the first grayscale and the second grayscale may be different grayscales, and thus the first sensing data signal and the second sensing data signal may have different voltage levels. For example, when the first sensing data signal is greater than the second sensing data signal, the first sensing voltage may be set to a value greater than the second sensing voltage. Therefore, the first sensing current and the second sensing current may have sensing values from which error attributable to the channel length modulation effect of the driving transistor is removed.

Meanwhile, the mobility characteristics and threshold voltage characteristics of the driving transistor may be simultaneously calculated during the first sensing period and the second sensing period. Unlike a conventional external compensation sensing scheme in which an operation of sensing mobility characteristics and an operation of sensing threshold voltage characteristics are different from each other, the method of driving the display device according to the present disclosure may simultaneously calculate mobility characteristics and threshold voltage characteristics using two sensing currents that are sensed during the first and second sensing periods. Therefore, the sensing time may be shortened, and the accuracy of real-time sensing may be improved.

In an embodiment, the method of driving the display device may further include the step S600 of compensating for input image data based on the calculated characteristics of the driving transistor.

Because the method of driving the display device has been described above in detail with reference to FIGS. 1 to 8B, repeated descriptions thereof will be omitted.

As described above, the display device and the method of driving the display device according to embodiments of the present disclosure may change the voltage level of first power that is supplied to a drain electrode of a driving transistor depending on a grayscale value for current sensing during external compensation driving. Therefore, a channel length modulation effect of a driving transistor is reflected in image data compensation, so that a compensation error may be greatly decreased, and image quality may be improved.

Although the embodiments of the present disclosure have been described, those skilled in the art will appreciate that the present disclosure may be modified and changed in various forms without departing from the spirit and scope of the present disclosure as claimed in the accompanying claims.

The invention claimed is:

1. A display device comprising:

a pixel including a light-emitting element, a first transistor configured to control an amount of current flowing into the light-emitting element, and a second transistor connected between the first transistor and a sensing line;

a power supply which supplies power of different voltages to a drain electrode of the first transistor during a sensing period; and a sensing circuit which senses sensing currents supplied through the sensing line during the sensing period, wherein the sensing period includes a first sensing period during which the sensing circuit senses a first sensing current of the sensing currents based on a first sensing data signal corresponding to a first grayscale, and a second sensing period during which the sensing circuit senses a second sensing current of the sensing currents based on a second sensing data signal corresponding to a second grayscale, wherein the voltage of the power supplied to the drain electrode of the first transistor during the first sensing period is a first sensing voltage, and wherein the voltage of the power supplied to the drain electrode of the first transistor during the second sensing period is a second sensing voltage different from the first sensing voltage.

2. The display device according to claim 1, wherein the second grayscale is different from the first grayscale.

3. The display device according to claim 1, wherein the sensing circuit simultaneously calculates mobility characteristics and threshold voltage characteristics of the first transistor by using the first sensing current and the second sensing current.

4. The display device according to claim 1, wherein the first sensing period and the second sensing period successively progress.

5. The display device according to claim 1, wherein a difference between the first sensing voltage and the second sensing voltage is a result obtained by reflecting a difference between channel length modulation effects of the first transistor depending on a difference between the first grayscale and the second grayscale.

6. The display device according to claim 1, wherein the difference between the first sensing voltage and the second sensing voltage is proportional to a difference between a gate-source voltage of the first transistor corresponding to the first sensing data signal and a gate-source voltage of the first transistor corresponding to the second sensing data signal.

7. The display device according to claim 1, wherein the pixel further comprises:

a third transistor connected between the first transistor and a data line, and the display device further comprises:

a data driver supplies which supplies the first sensing data signal to the data line during the first sensing period, and the second sensing data signal to the data line during the second sensing period.

8. The display device according to claim 1, wherein the sensing circuit comprises:

an analog-to-digital converter which converts the first sensing current and the second sensing current into first sensing data and second sensing data, each having a digital format; and a compensator which calculates mobility characteristics and threshold voltage characteristics of the first transistor by performing an operation on the first sensing data and the second sensing data and determines a compensation value for image data based on the mobility characteristics and the threshold voltage characteristics.

9. The display device according to claim 8, wherein the sensing circuit further comprises:

a memory which stores at least one of the first sensing data and the second sensing data.

10. A method of driving a display device, comprising:

supplying a first sensing data signal corresponding to a first grayscale, and power having a first sensing voltage to a pixel during a first sensing period;

sensing a first sensing current, generated based on the first sensing voltage, from the pixel during the first sensing period;

supplying a second sensing data signal corresponding to a second grayscale, the power having a second sensing voltage to the pixel during a second sensing period;

sensing a second sensing current, generated based on the second sensing voltage, from the pixel during the second sensing period; and calculating characteristics of a first transistor of the pixel using the first sensing current and the second sensing current, wherein the first sensing data signal and the second sensing data signal are different from each other, wherein the voltage of first power supplied to a drain electrode of the first transistor during the first sensing period is the first sensing voltage, and wherein the voltage of the power supplied to the drain electrode of the first transistor during the second sensing period is the second sensing voltage different from the first sensing voltage.

11. The method according to claim 10, wherein mobility characteristics and threshold voltage characteristics of the characteristics of the first transistor are simultaneously calculated based on the first sensing current and the second sensing current.

12. The method according to claim 10, further comprising:

compensating for input image data based on the calculated characteristics of the first transistor.

13. The method according to claim 10, wherein a reference voltage is applied to the pixel during the first sensing period, and wherein the reference voltage is applied to the pixel during the second sensing period.

* * * * *